(12) United States Patent
Iwasaki (10) Patent No.: US 12,215,983 B2
(45) Date of Patent: Feb. 4, 2025

(54) RIDING-TOGETHER VEHICLE CONTROL DEVICE AND SYSTEM

(71) Applicants: Nissan Motor Co., Ltd., Kanagawa (JP); RENAULT S.A.S., Boulogne-Billancourt (FR)

(72) Inventor: Eijo Iwasaki, Kanagawa (JP)

(73) Assignees: Nissan Motor Co., Ltd., Kanagawa (JP); RENAULT S.A.S., Boulogne-Billancourt (FR)

(*) Notice: Subject to any disclaimer, the term of this patent is extended or adjusted under 35 U.S.C. 154(b) by 650 days.

(21) Appl. No.: 17/414,629

(22) PCT Filed: Dec. 17, 2018

(86) PCT No.: PCT/IB2018/001566
§ 371 (c)(1),
(2) Date: Jun. 16, 2021

(87) PCT Pub. No.: WO2020/128553
PCT Pub. Date: Jun. 25, 2020

(65) Prior Publication Data
US 2022/0065642 A1 Mar. 3, 2022

(51) Int. Cl.
*G01C 21/34* (2006.01)
*B60W 60/00* (2020.01)
(52) U.S. Cl.
CPC ....... *G01C 21/3461* (2013.01); *B60W 60/001* (2020.02); *G01C 21/3438* (2013.01)

(58) Field of Classification Search
CPC ........... G01C 21/3461; G01C 21/3438; B60W 60/001; G06V 20/56; G06V 20/59; G07B 15/00; G07C 9/00571
See application file for complete search history.

(56) References Cited

U.S. PATENT DOCUMENTS

| | | | |
|---|---|---|---|
| 6,414,591 B1* | 7/2002 | Watanabe | B60R 16/0373 340/425.5 |
| 8,095,267 B2 | 1/2012 | Mino | |
| 9,845,048 B1* | 12/2017 | Tseng | B60Q 1/525 |
| 10,147,325 B1* | 12/2018 | Copeland | G06Q 20/145 |
| 10,593,213 B1* | 3/2020 | Copeland | H04L 63/0861 |
| 10,726,360 B2 | 7/2020 | Fujimoto | |
| 2009/0248254 A1 | 10/2009 | Mino | |
| 2015/0175072 A1* | 6/2015 | Sabeti | G06V 20/58 348/148 |

(Continued)

FOREIGN PATENT DOCUMENTS

| | | |
|---|---|---|
| CN | 101545341 A | 9/2009 |
| JP | 2000170422 A | 6/2000 |

(Continued)

*Primary Examiner* — Kenny Nguyen
(74) *Attorney, Agent, or Firm* — Osha Bergman Watanabe & Burton LLP (57) ABSTRACT

A vehicle control device according to an embodiment of the present invention comprises a riding cancel switch and a controller. In a case where a first user in the vehicle permitted a riding-together with a second user, after the vehicle stopped at a riding location where the second user will ride on the vehicle, then, when the riding cancel switch is operated before a door of the vehicle is fully opened, the controller prohibits unlocking of the door or opening of the door.

11 Claims, 9 Drawing Sheets

(56) References Cited

U.S. PATENT DOCUMENTS

| | | | |
|---|---|---|---|
| 2016/0171637 A1* | 6/2016 | Rai | G06Q 50/30 |
| | | | 705/13 |
| 2017/0045890 A1* | 2/2017 | Gurin | B60W 50/085 |
| 2017/0132934 A1* | 5/2017 | Kentley | G08G 1/202 |
| 2017/0249797 A1* | 8/2017 | Elie | G07F 17/0057 |
| 2017/0316533 A1* | 11/2017 | Goldman-Shenhar | |
| | | | H04L 67/306 |
| 2018/0039917 A1* | 2/2018 | Buttolo | B60W 60/00253 |
| 2018/0068505 A1* | 3/2018 | Mullett | H04W 4/80 |
| 2018/0100335 A1* | 4/2018 | Yun | E05B 77/54 |
| 2018/0129981 A1* | 5/2018 | Fujimoto | G08G 1/0962 |
| 2019/0031144 A1* | 1/2019 | Gat | B60R 25/25 |
| 2019/0114732 A1* | 4/2019 | Tanabe | G06Q 10/063116 |
| 2019/0137290 A1* | 5/2019 | Levy | G05D 1/0276 |
| 2019/0180545 A1* | 6/2019 | Tsujimura | G07F 5/26 |
| 2019/0367036 A1* | 12/2019 | Brombach | G07C 9/00571 |
| 2020/0018100 A1* | 1/2020 | Aoi | G01C 21/3407 |
| 2021/0323446 A1* | 10/2021 | Christensen | B60N 2/4235 |

FOREIGN PATENT DOCUMENTS

| | | |
|---|---|---|
| JP | 2004190233 A | 7/2004 |
| JP | 2009289192 A | 12/2009 |
| JP | 2011048776 A | 3/2011 |
| JP | 201873351 A | 5/2018 |
| JP | 2018144686 A | 9/2018 |
| WO | 2018097813 A1 | 5/2018 |

* cited by examiner

RIDING-TOGETHER VEHICLE CONTROL DEVICE AND SYSTEM

TECHNICAL FIELD

The present invention relates to vehicle control methods, vehicle control devices, and vehicle control systems.

BACKGROUND ART

Methods are known that supports a riding-together for a plurality of users travelling to a same destination (Patent Literature 1). The invention disclosed in Patent Document 1 provides a carpool candidate with an information of a vehicle when the driver who acquired an information of a carpool candidate permits the riding-together.

CITATION LIST

Patent Literature

Patent Literature 1: Japanese Patent Application Publication No. 2009-289192

SUMMARY OF INVENTION

Technical Problem

When the invention disclosed in Patent Document 1 is applied to an autonomous vehicle in which a driver does not exist, a passenger who has earlier rode on the autonomous vehicle (hereinafter referred to as "earlier passenger") permits the riding-together with a passenger who will ride on later (hereinafter referred to as "carpool passenger). On the other hand, even when the earlier passenger once permitted the riding-together with the carpool passenger, depending on the carpool passenger's appearance or the like, the earlier passenger may want to cancel the riding-together with the carpool passenger. However, the invention disclosed in Patent Document 1 does not describe that cancelling the riding-together after the earlier passenger permitted the riding-together.

In view of the foregoing problem, the present invention provides a vehicle control method, a vehicle control device, and a vehicle control system can cancel the riding-together of a second user even when a user who has earlier rode on the autonomous vehicle (first user) permitted the riding-together with a user who will ride on later (second user).

Solution to Problem

A vehicle control method according to an aspect of the present invention, in a case where a first user in the vehicle permitted a riding-together with a second user, after the vehicle stopped at a riding location where the second user will ride on the vehicle, then, when an operation for cancelling the riding of the second user is conducted by the first user before a door of the vehicle is fully opened, prohibiting an unlock of the door or an open of the door.

Advantageous Effects of Invention

The present invention can cancel the riding-together of the second user even when even when the first user permitted the riding-together.

DESCRIPTION OF EMBODIMENTS

Hereinafter, an embodiment of the present invention will be described with reference to the drawings. In the illustration of the drawings, the same constituents are denoted by the same reference signs, and description thereof is omitted.

Figure 1:
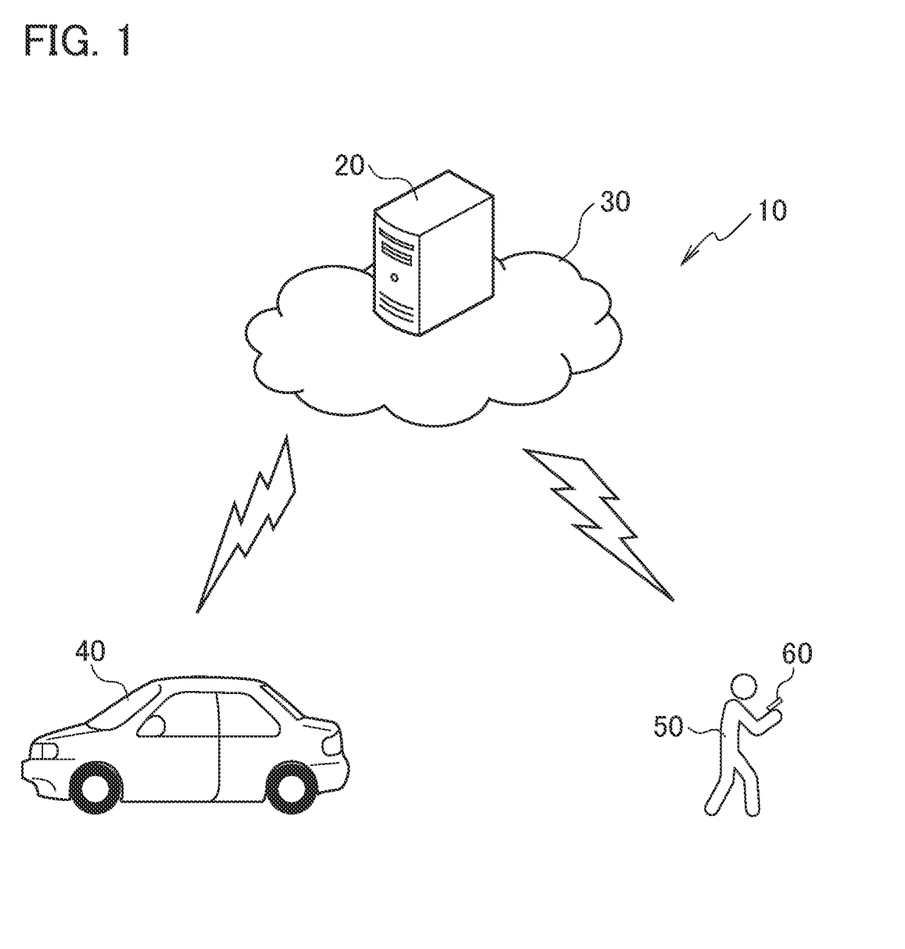
FIG. 1 is a schematic diagram illustrating a vehicle control system according to an embodiment of the present invention.

The configuration of a vehicle control system 10 will be described with reference to FIG. 1. As shown in FIG. 1, the vehicle control system 10 includes a computer 20, a communication network 30, a vehicle 40, a user 50 (first user), and a terminal device 60 held by the user 50. In FIG. 1 illustrates the one vehicle, but the number of the vehicles is not limited to this case. The vehicle control system 10 may include two or more vehicles.

The computer 20 communicates via a communication network 30 with the vehicle 40 and the terminal device CO. The computer 20 is a genera-purpose computer, for example, and include a CPU or a processor including a memory such as a read only memory (ROM) and a random-access memory (RAM). The CPU reads out a program stored in the ROM and the like to the RAM to execute the program. Part of (or all of) the vehicle control system 10 including the functions of the computer 20 described below may be implemented by an application (such as software as a service (SaaS)). The computer 20 may also be a server.

The communication network 30 may be configured in either a wireless manner or a wired manner, or in both wireless and wired manners, or may include the Internet. According to the present embodiment, the computer 20, the vehicle 40, and the terminal device 60 are connected to the communication network 30 in wireless communications.

The vehicle 40 has autonomous driving functions. The autonomous driving according to the present embodiment refers to a state presumed that a system installed in the vehicle 40 executes all operations regarding driving. The vehicle 40 thus do not require a driver to get therein. Namely, the vehicle 40 can drive autonomously with no occupants. A driver, of course, can get in the vehicle 40. The autonomous driving according to the present embodiment is at Level 4 or higher.

The user 50 reserves the vehicle 40 by using the terminal device 60. The computer 20 receives the reservation information related to the reservation from the terminal device 60. The computer 20 transmits, to the vehicle 40, a location at which the user 50 is to get on the vehicle 40 (hereinafter referred to as a "riding location") and a travelling route to the riding location, based on the reservation information. Further, the computer 20 transmits, to the vehicle 40, a destination of the user 50 and a travelling route to the destination based on the reservation information. The vehicle 40 autonomously travels to the riding location based on the information acquired from the computer 20. The vehicle 40 allows the user 50 to get in at the riding location and transports the user 50 to the destination. Then, the vehicle 40 autonomously returns to a predetermined standby point. In present embodiment, a user ID for identifying the user 50 and a vehicle ID for identifying the vehicle 40 are linked by the computer 20. The terminal device 60 is a device that the user 50 can carry around, and can be a smartphone or a tablet, for example.

Next, the computer 20, the vehicle 40, and the terminal device 60 will be described with reference to FIG. 2.

Figure 2:
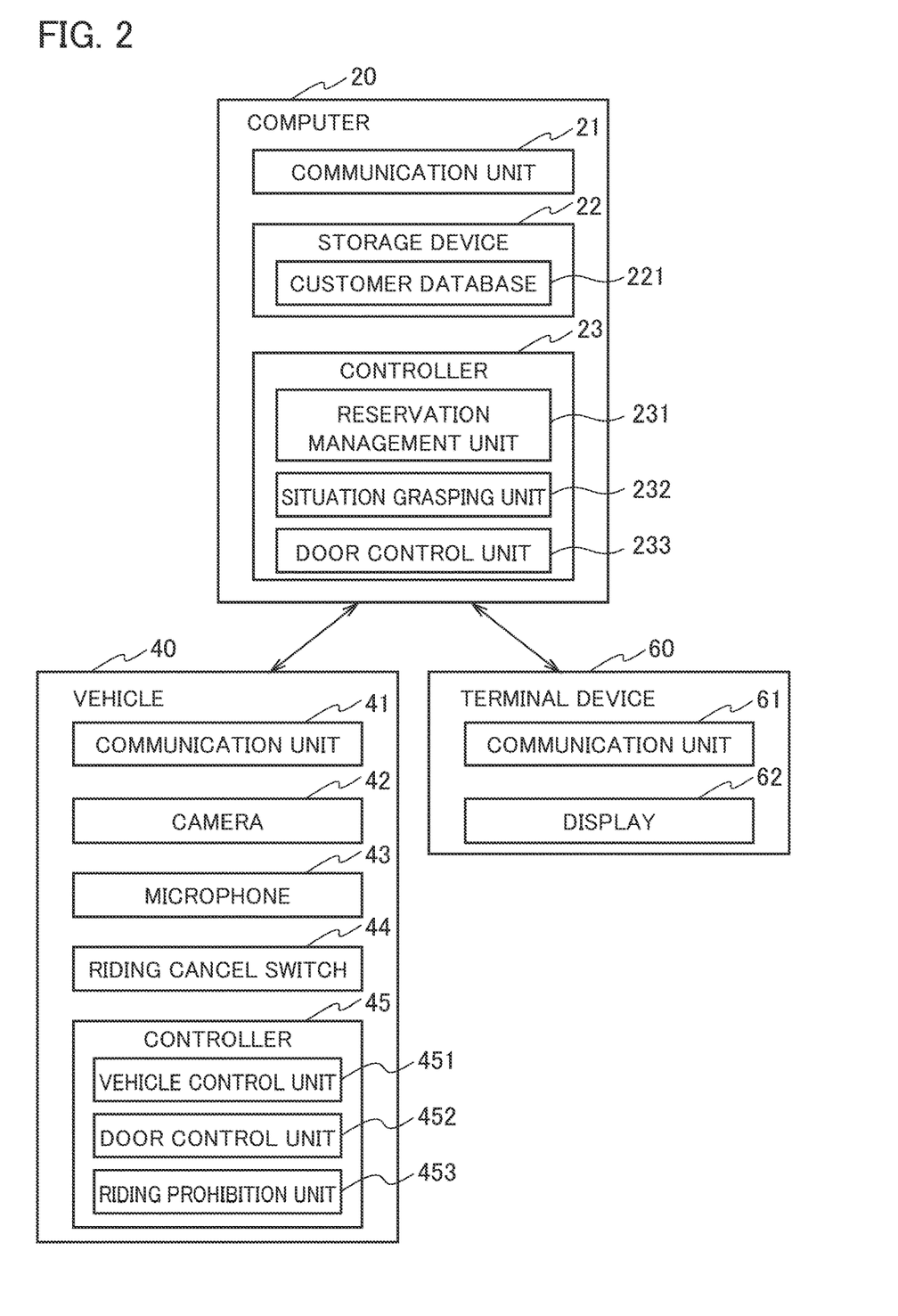
FIG. 2 is a schematic configuration diagram illustrating the vehicle control system according to an embodiment of the present invention.

As shown in FIG. 2, the computer 20 includes a communication unit 21, a storage device 22, and a controller 23. The vehicle 40 includes a communication unit 41, a camera 42, a microphone 43, a riding cancel switch 44, and a controller 45. The terminal device 60 includes a communication unit 61 and a display 62.

The communication unit 21, the communication unit 41, and the communication unit 61 are each an interface connected to the communication network 30 to transmit and receive data. In the present embodiment, the vehicle 40 and the terminal device 60 communicate with each other via the computer 20. That is, the vehicle 40 and the terminal device 60 do not directly communicate with each other.

The storage device 22 includes single or plural random-access memories (RAMS) serving as accessible storage devices. A customer database 221 is stored in the storage device 22. The customer database 221 will be described later.

The controller 23 functions as a plurality of information processing circuits. While the present embodiment is illustrated with a case in which the software is installed to fabricate the respective information processing circuits included in the computer 20, dedicated hardware for executing each information processing as described below can be prepared to fabricate the information processing circuits. The respective information processing circuits may be implemented by individual hardware. The controller 23 includes a reservation management unit 231, a situation grasping unit 232, and a door control unit 233, as the information processing circuits.

The reservation management unit 231 manages the reservation information of the user 50. The situation grasping unit 232 grasps a situation at a site by using the information acquired from the camera 42 and the microphone 43. Details will be described later.

The door control unit 233 has a function of controlling the locking and unlocking of the doors of the vehicle 40. The door control unit 233 has a function of controlling the opening and closing of the door of the vehicle 40. More specifically, the door control unit 233 transmits signals for controlling the locking and unlocking of the doors of the vehicle 40 to the door control unit 452. The door control unit 233 transmits signals for controlling the opening and closing of the door of the vehicle 40 to the door control unit 452.

The camera 42 has an image capturing device, such as a charge-coupled device (CCD) or a complementary metal oxide semiconductor (CMOS). The camera. 42 is mounted outside the vehicle 40 and inside the vehicle 40. The camera 42 images around the vehicle 40 and inside the vehicle 40. Images (or video) captured by the camera 42 is transmitted via, the communication unit 41 to the computer 20.

The microphone 43 acquires voice outside the vehicle 40 and inside the vehicle 40. The voice acquired by the microphone 43 is transmitted via the communication unit 41 to the computer 20.

The riding cancel switch 44 is mounted inside the vehicle 40. The riding cancel switch 44 may be a mechanical switch or a virtual switch displayed on the display. The riding cancel switch 44 is used when the user 50 in the vehicle 40 stops the riding (ride to the vehicle 40) of another user. An operation of the riding cancel switch 44 includes pressing the riding cancel switch 44.

The controller 45 functions as a plurality of information processing circuits similarly to the controller 23. The controller 45 includes a vehicle control unit 451, a door control unit 452, and a riding prohibition unit 453, as the information processing circuits.

The vehicle control unit 451 controls the vehicle 40 using a well-known technique. Specifically, the vehicle control unit 451 controls a brake actuator, an accelerator actuator, a steering actuator, and the like based on information acquired by various sensors (a laser range finder, etc.) mounted on the vehicle 40. Thus, the autonomous driving is realized.

The door control unit 452 controls the locking and unlocking of the door of the vehicle 40 based on the signal received from the door control unit 233. The door control unit 452 also controls the opening and closing of the door of the vehicle 40 based on the signal received from the door control unit 233. The door control unit 452 can also control the door without receiving the signal from the door control unit 233. The door control unit 452 can acquire the signal indicating that the riding cancel switch 44 has been operated.

The riding prohibition unit 453 prohibits the door control unit 452 from unlocking the door or opening the door.

Next, an operation example of the vehicle control system 10 will be described with reference to FIG. 3-6.

Figure 3:
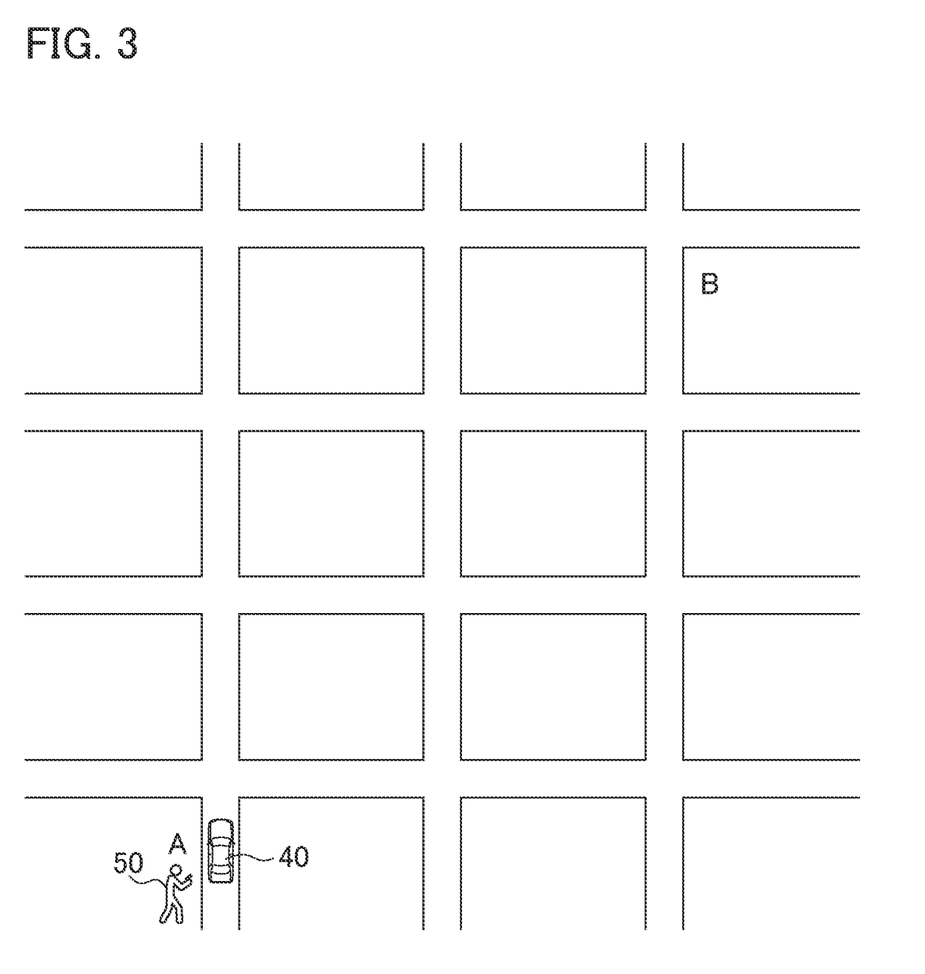
FIG. 3 is a diagram for explaining an example of the vehicle control system according to an embodiment of the present invention.

A scene shown in FIG. 3 will be described. The user 50 has reserved the vehicle 40, and the computer 20 receives the reservation information related to the reservation from the terminal device 60. The computer 20 transmits, to the vehicle 40, the riding location A where the user 50 rides on the vehicle 40 and the travelling route to the riding location A based on the reservation information. The vehicle 40 autonomously travels to the riding location A acquired from the computer 20. As shown in FIG. 3, when the vehicle 40 arrived at the riding location A, the vehicle 40 recognizes the user 50. The recognition method of the user 50 uses a well-known technique. After the vehicle 40 recognizes the user 50, the door control unit 452 unlocks the door and opens the door. The door control unit 233 may instruct the door control unit 452 to unlock the door and open the door.

After the user 50 rode on the vehicle 40, the door control unit 452 closes the door and locks the door. Thereafter, the vehicle 40 autonomously travels toward the destination 13 of the user 50. All doors are locked while vehicle 40 is autonomously travelling.

Figure 4:
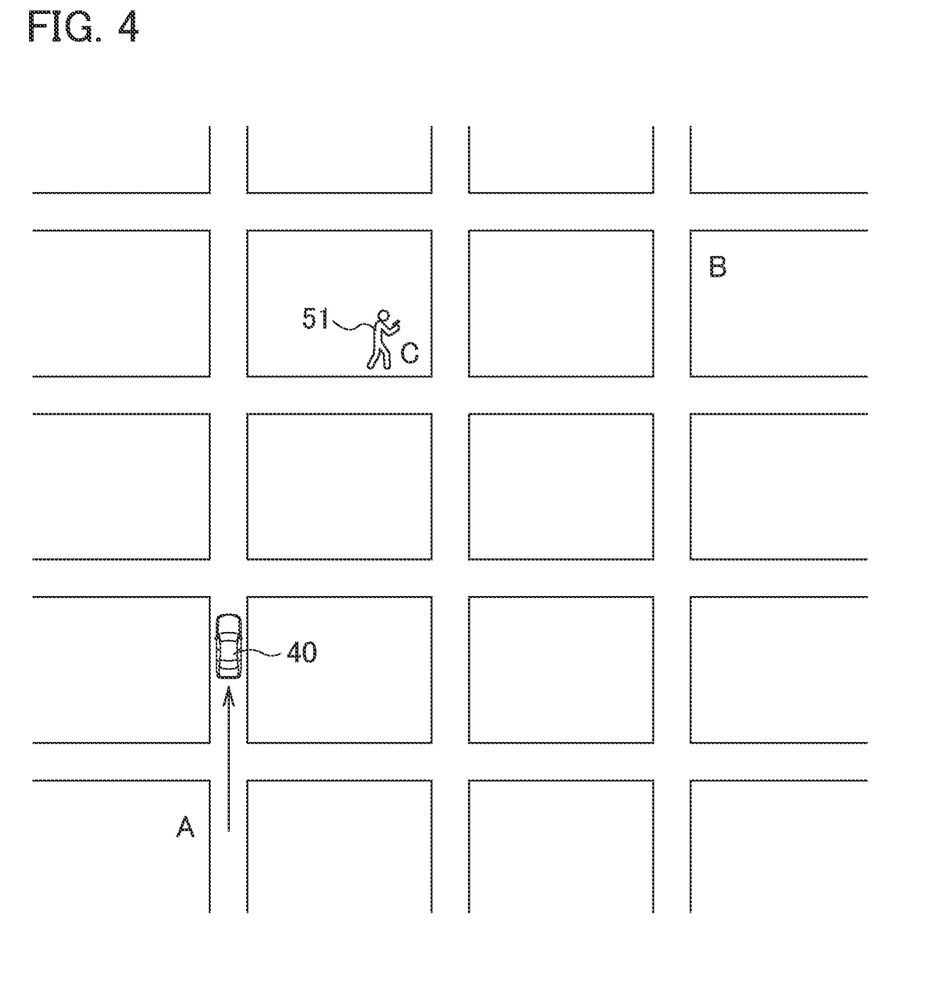
FIG. 4 is a diagram for explaining an example of the vehicle control system according to an embodiment of the present invention.
Figure 5:
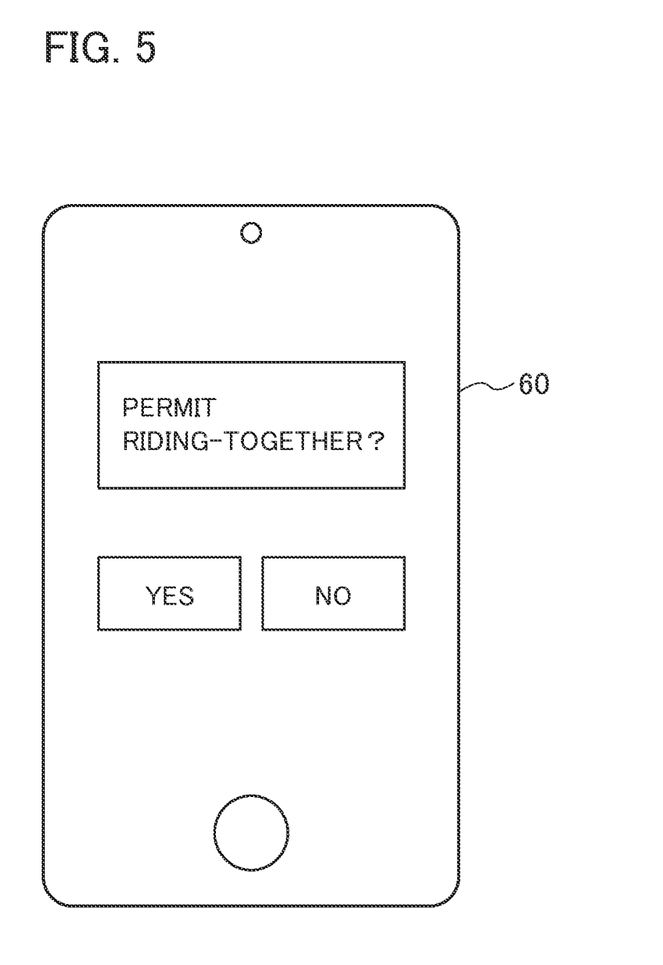
FIG. 5 is a diagram illustrating an example of information output to a terminal device.

Next, a user 51 (second user) who wishes a riding-together to the vehicle 40 will be described with reference to FIG. 4. As shown in FIG. 4, assume that the user 51 wishes the riding-together to the vehicle 40 while the vehicle 40 is autonomously travelling toward the destination B of the user 50. In this case, the computer 20 receiving the user 51's request for riding-together asks the user 50 (terminal device 60) whether to permit the riding-together with user 51 (refer to FIG. 5). When the user 50 permitted the riding-together, the computer 20 transmits, to the vehicle 40, a riding location C where the user 51 rides on the vehicle 40 and a travelling route to the riding location C. The vehicle 40 autonomously travels to the riding location C acquired from the computer 20.

Figure 6:
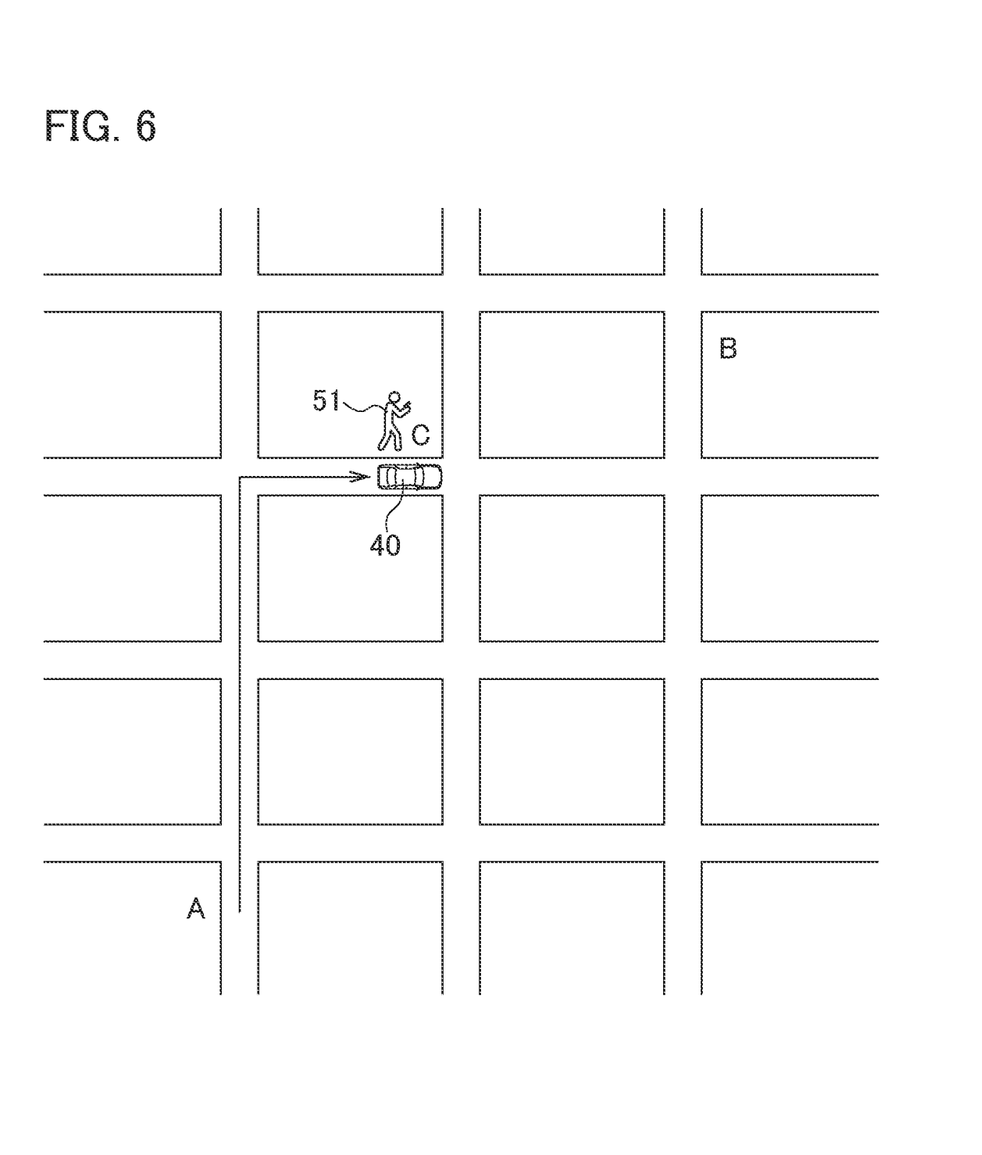
FIG. 6 is a diagram for explaining an example of the vehicle control system according to an embodiment of the present invention.

As shown in FIG. 6, when the vehicle 40 arrived at the riding location C, the vehicle 40 recognizes the user 51. After the vehicle 40 recognizes the user 51, the door control unit 452 unlocks the door and opens the door. At this time, depending on the user 51's appearance (for example, drunkard), there is a case where the user 50 wants to cancel the riding-together with the user 51. At the point of time when the user 50 permitted the riding-together with the user 51, the user 50 cannot confirm the user 51's appearance. However when the vehicle 40 arrives at the riding location C, the user 50 can confirm the user 51's appearance. That is, although the user 50 once permitted the riding-together with the user 51, depending on the user 51's appearance or the like, the user 50 may want to cancel the riding-together with the user 51.

Therefore, after the vehicle 40 stopped at the riding location C where the user 51 will ride on the vehicle 40, then, when the user 50 operated the riding cancel switch 44 before the door of the vehicle 40 is fully opened, the door control unit 452 controls the door so that the user 51 cannot ride on the vehicle 40. In other words, when the riding cancel switch 44 is operated before the two conditions "stop of the vehicle 40" and "fully door open" are satisfied, the door control unit 452 controls the door so that the user 51 cannot ride on the vehicle 40.

On the other hand, the door control unit 452 can accept the operation of the riding cancel switch 44 after the user 50 permitted the riding-together. That is, after the user 50 permitted the riding-together, the door control unit 452 can control the door so that the user 51 cannot ride on the vehicle 40 when the riding cancel switch 44 is operated. However, the door control unit 452 may use the arrival of the vehicle 50 at the riding location C where the user 50 can confirm the user 51's appearance or the stop of the vehicle 40 as a start trigger of cancel controlling of the riding-together.

Next, a specific example of door control will be described. After the vehicle 40 stopped at the riding location C, then, when the user 50 operated the riding cancel switch 44 before unlocking the door, the riding prohibition unit 453 prohibits the unlock of the door. Thus, the user 50 can cancel the riding of the user 51.

Further, after the vehicle 40 stopped at the riding location C, then, when the door is unlocked and the user 50 operated the riding cancel switch 44 before the door is fully opened, the riding prohibition unit 453 prohibits the open of the door. In the present embodiment, the prohibition of opening of the door includes the prohibition of opening the door and closing the door in the middle of opening the door. Thereafter, the door control unit 452 locks the door. Thus, the user 50 can cancel the riding of the user 51. The reason why stop of the vehicle 40 is a trigger is that when the vehicle 40 stops, the user 50 can easily confirm the user 51's appearance.

Further, after the vehicle 40 stopped at the riding location C, then, when the user 50 operated the riding cancel switch 44 before the user 51 checks-in, the door control unit 452 may control the door so that the user 51 cannot ride on the vehicle 40. In the present embodiment, check-in means that the recognition of the user 51 is completed and the user 51 rides on the vehicle 40.

Figure 7:
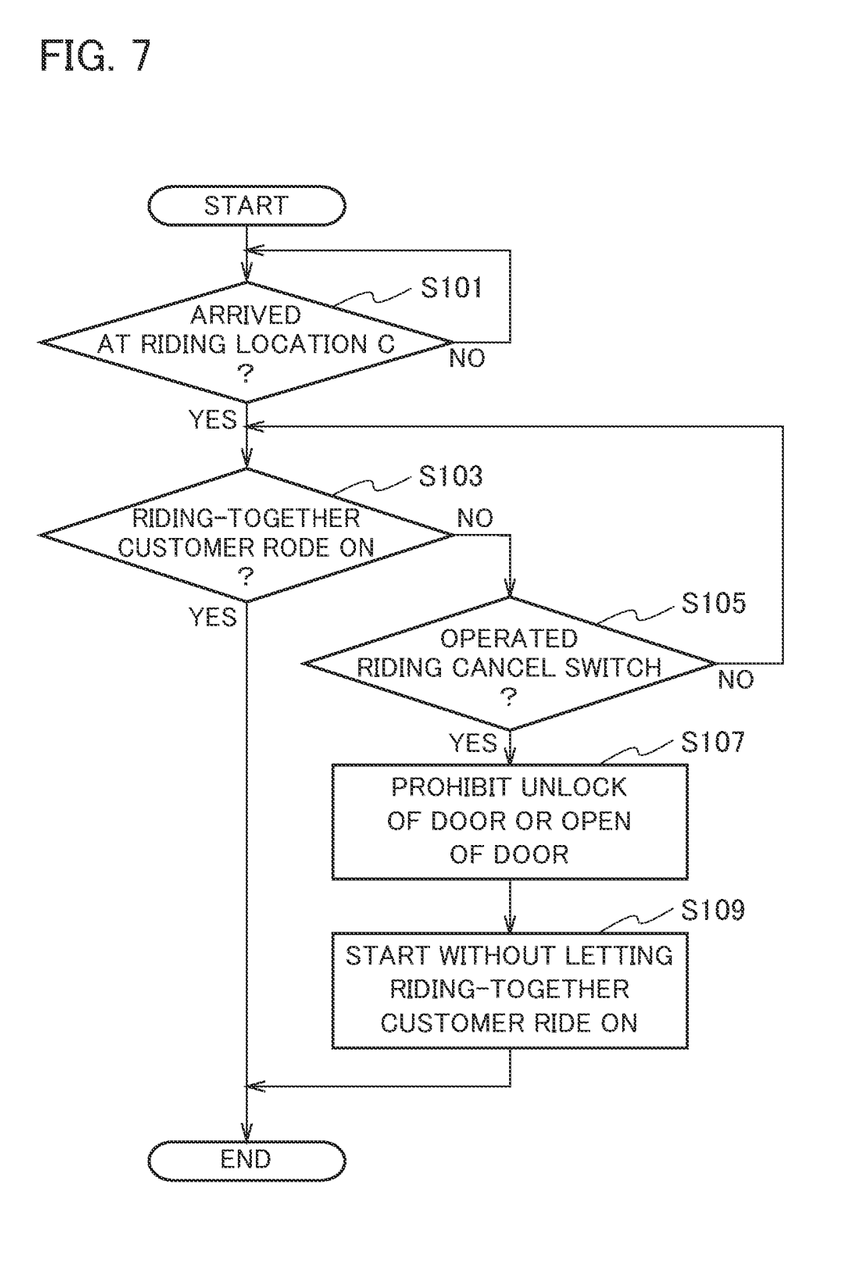
FIG. 7 is a flowchart illustrating an example of operation of a computer according to the embodiment of the present invention.
Figure 8:
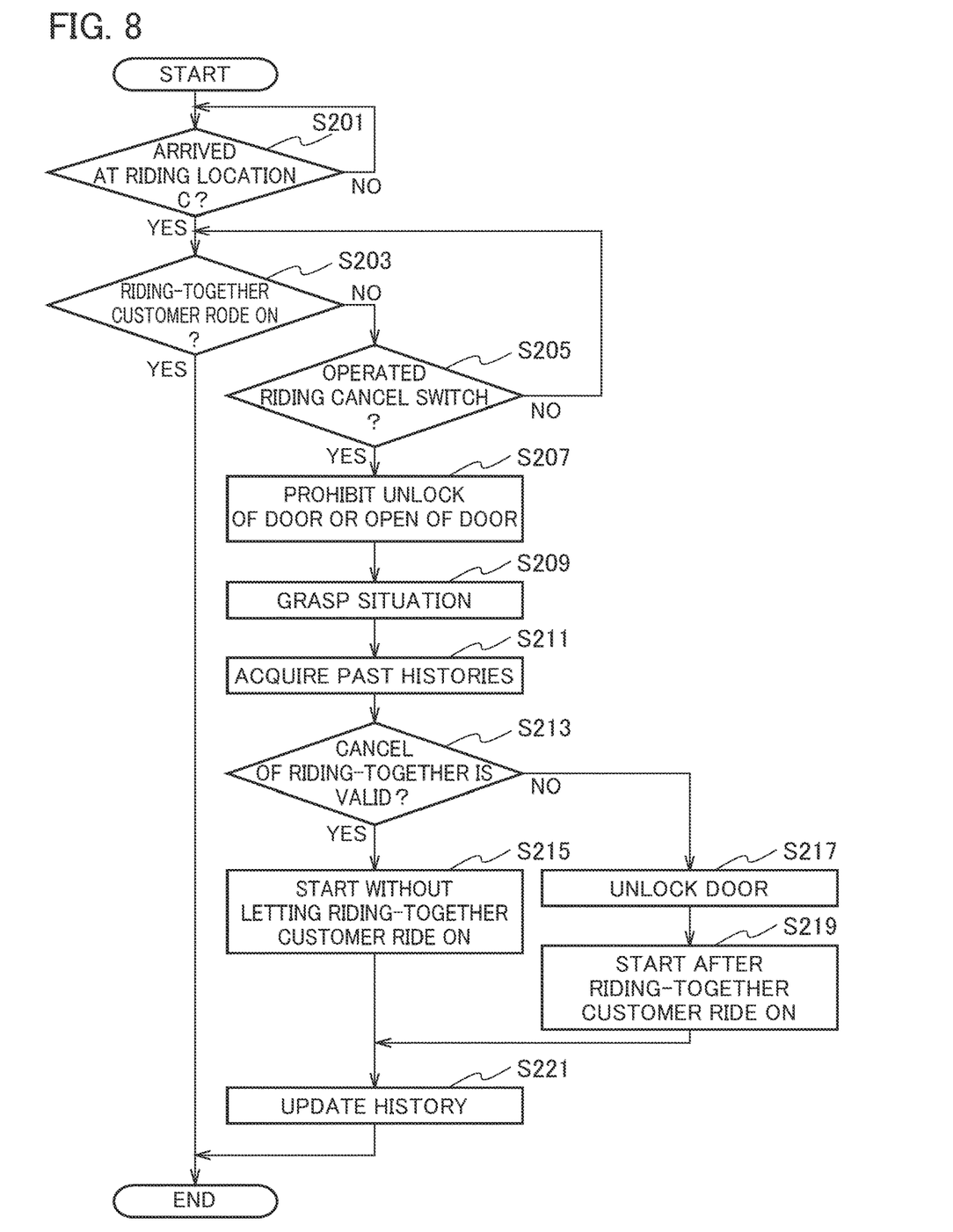
FIG. 8 is a flowchart illustrating the different operation example of the computer according to the embodiment of the present invention.
Figure 9:
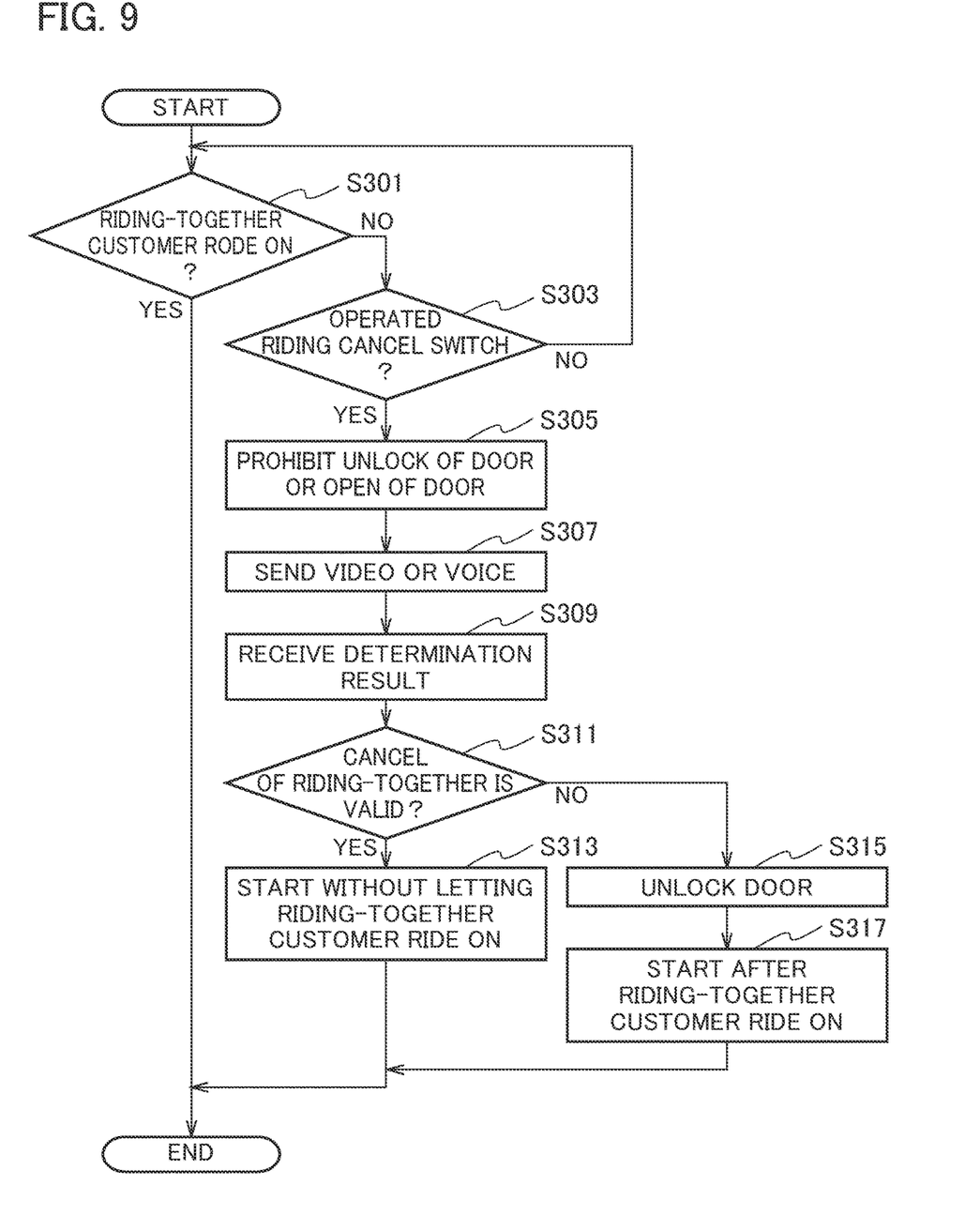
FIG. 9 is a flowchart illustrating an example of operation of a vehicle according to the embodiment of the present invention.

Next, an operation example of the vehicle control system 10 will be described with reference to flowcharts of FIGS. 7 to 9.

First of all, an operation example of the computer 20 will be described with reference to FIG. 7. At step S101, the reservation management unit 231 determines whether or not the vehicle 40 arrived at the riding location C using the position information of the vehicle 40. When the vehicle 40 arrived at the riding location C (Yes at step S101), the process proceeds to step S103. When the vehicle 40 does not arrive at the riding location C (No at step S101), the process waits.

At step S103, the reservation management unit 231 determines whether or not the user 51 (the riding-together passenger) rode on the vehicle 40. As an example, the reservation management unit 231 may use the image of the camera 42 to determine whether or not the user 51 rode on the vehicle 40. When the user 51 rode on the vehicle 40 (Yes at step S103), the series of steps comes to an end. When the user 51 does not ride on the vehicle 40 (No at step S103), the process proceeds to step S105.

At step S1055, the door control unit 233 determines whether or not the user 50 operated the riding cancel switch 44. When the user 50 operated the riding cancel switch 44, a signal indicating that it was operated is transmitted to the door control unit 233. The door control unit 233 determines whether or not the user 50 operated the riding cancel switch 44 in accordance with the on/off of this signal. When the user 50 operated the riding cancel switch 44 (Yes at step S105), the process proceeds to step S107. On the other hand, when the user 50 does not operate the riding cancel switch 44 (No at step S105), the process returns to step S103.

At step S107. After the vehicle 40 stopped at the riding location C, then, when the user 50 operated the riding cancel switch 44 before unlocking the door, the door control unit 233 transmits a signal for prohibiting the unlock of the door to the riding prohibition unit 453. When the riding prohibition unit 453 receives this signal, the riding prohibition unit 453 prohibits the unlock of the door. Thus, the user 50 can cancel the riding of the user 51. Further, after the vehicle 40 stopped at the riding location C, then, when the door is unlocked and the user 50 operated the riding cancel switch 44 before the door is fully opened, the door control unit 233 transmits a signal for prohibiting the open of the door to the riding prohibition unit 453. When the riding prohibition unit 453 receives this signal, the riding prohibition unit 453 prohibits the open of the door. When the riding prohibition unit 453 detected the operation of the riding cancel switch 44 by the user 50, the riding prohibition unit 453 can prohibits the unlock of the door or the open of the door without receiving the signal from the door control unit 233. The process proceeds to step S109, at which the computer 20 starts the vehicle 40 without letting the user 51 ride on the vehicle 40.

Next, another operation example of the computer 20 will be described with reference to FIG. 8. The processes of steps S201 to S207 and S215 shown in FIG. 8 are the same as those of steps S101 to S109 shown in FIG. 7, and overlapping explanations are not repeated below. At step S209, the situation grasping unit 232 grasps the situation of the site (the riding location C) using the information acquired from the camera 42 or the microphone 43. The purpose of the situation grasping unit 232 grasping the situation at the site is to judge the validity of the operation by the user 50. Here, the operation by the user 50 means that the user 50 operated the riding cancel switch 44. For example, the situation grasping unit 232 may use the video acquired from the camera 42 to grasp whether or not the user 51 is a drunkard. Further, the user 50 may, through the microphone 43, notify the reason for operating the riding cancel switch 44 to the situation grasping unit 232. The situation grasping unit 232 can recognize the voice of the user 50 by using the speech recognition technology. Further, the situation grasping unit 232 may acquire the past histories of the user 50 and user 51 from the customer database 221. The past histories means, for example, information such as that the user 51 was refused the riding-together a plurality of times in the past.

The process proceeds to step S213, at which the situation grasping unit 232 determines the validity of the operation by the user 50 based on the situation at the site, that is, using the information acquired from the camera 42 or the microphone 43. For example, when the situation grasping unit 232 determines from the video of the camera 42 that the user 51 is the drunkard, the situation grasping unit 233 may determine that the operation by the user 50 is valid. Further, the situation grasping unit 232 may determine that the operation by the user 50 is valid according to an explanation of the user 50 acquired from the microphone 43.

Further, the situation grasping unit 232 may determine the validity of the operation by the user 50 based on the situation at the site and the past histories. For example, when the user 51 is the drunkard and the user 51 was refused the riding-together a plurality of times in the past, the situation grasping unit 232 may determine that the operation by the user 50 is valid. Thus, the accuracy of the determination of the validity can be improved by using the situation at the site and the past histories by the situation grasping unit 232. On the other hand, when the reason in regard to the operation by the user 50 is not permitted, the situation grasping unit 232 may determine that the operation by the user 50 is not valid.

When the situation grasping unit 232 determines that the operation by the user 50 is valid (Yes at step S213), the process proceeds to step S215. Thereafter, the process proceeds to step S221, at which the situation grasping unit 232 stores the result of this determination as the history of the user 50 and the user 51 in the customer database 221, and updates the history of the user 50 and the user 51. Such accumulated information can contribute to improving the accuracy of the determination of the validity.

On the other hand, when the situation grasping unit 232 determines that the operation by the user 50 is not valid (No at step S213), the process proceeds to step S217. At step S217, the door control unit 233 transmits a signal for unlocking the door to the door control unit 452. When the door control unit 452 receives this signal, the door control unit 452 unlocks the door. The process proceeds to step S219. After the user 51 rides on the vehicle 40, the computer 20 starts the vehicle 40. Thereafter, the process proceeds to step S221.

Next, an operation example of the vehicle 40 will be described with reference to FIG. 9.

The processes of steps S301 to S305 and S311 to S317 are the same as those of steps S203 to S207 and S213 to S219 shown in FIG. 8, and overlapping explanations are not repeated below. At step S307, the communication unit 41 transmits the image (the video) captured by the camera 42 and the voice acquired by the microphone 43 to the computer 20. The process proceeds to step S309, at which the door control unit 452 receives a determination result of the validity of the operation.

As has been described above, the vehicle control system 10 according to the present embodiment, provides the following operational advantages.

The vehicle according to the present embodiment is capable of being ridden by a plurality of users, and is capable of autonomous travelling. After the vehicle 40 stopped at the riding location C where the user 51 will ride on the vehicle 40, then, when the riding cancel switch 44 is operated before the door of the vehicle 40 is fully opened, the riding prohibition unit 453 prohibits the unlock of the door or the open of the door. The vehicle control system 10 can cancel the riding of the user 51 even when the user 50 once permitted the riding-together with the user 51. The door control unit 233 may have the same functions as the door control unit 452 and the riding prohibition unit 453. The vehicle control device comprises the input unit (the controller 45) that a signal from an operation unit (the riding cancel switch 44) operated by the first user in the vehicle (the first user who has earlier rode on the vehicle 40) is input, the door control unit 452 that unlocks a door of the vehicle or opens of the door, a control unit (the controller 45) that controls the door control unit 452 so as to unlock the door or open the door by detecting the vehicle stopped at a riding location where a second user will ride on the vehicle, after the vehicle stopped at the riding location where the second user will ride on the vehicle, then, when the signal was input from the operation unit before the door of the vehicle is fully opened, the riding prohibition unit 453 that prohibits unlocking of the door or opening of the door by the door control unit.

Further, when the computer 20 detected that user 50 operated the riding cancel switch 44, the computer determines the validity of the operation by user 50 using the information acquired from the camera 42 or the microphone 43. By this, the accuracy of the determination of the validity can be improved.

Further, the computer 20 may determine the validity using past histories relating to the user 50 and the user 51 stored in the storage device 22 (the customer database 221). By this, the accuracy of the determination of the validity can be improved.

Further, the computer 20 may store the determination result of the validity as the history of the user 50 and the user 51 in the storage device 22 (the customer database 221), and update the history of the user 50 and the user 51. Such accumulated information can contribute to improving the accuracy of the determination of the validity.

Further, when the riding prohibition unit 453 detects that the unlock of the door or the open of the door by the door control unit 452, the riding prohibition unit 453 may control the door control unit 452 so as to lock the door or close the door. That is, when the riding prohibition unit 453 detected that the user 50 operated the riding cancel switch 44, the riding prohibition unit 453 may control the door control unit 452 so as to lock the door or close the door.

Further, the vehicle according to the present embodiment may be a riding-together travelling service vehicle by a plurality of users.

Further, the riding prohibition unit 453 acquires an information relating to outside environment of the vehicle or an information relating to the user 51, then only when the riding prohibition unit 453 determines that the acquired information satisfies a predetermined condition, the riding prohibition unit 453 may prohibit unlocking of the door or opening of the door by the door control unit. The information relating to outside environment of the vehicle includes a captured image at the riding location of the user 51. The information relating to the user 51 includes a data input based on an operation of a person outside the vehicle at the riding location of the user 51. The predetermined condition includes in a case where the situation grasping unit 232 cannot identify the user 51 from the captured image at the riding location of the user 51, the captured image means the information relating to outside environment of the vehicle, or in a case where the data input based on the operation of the person outside the vehicle at the riding location of the user 51 does not coincide with a reserved information relating to the user 51, the data input based on the operation of the person outside the vehicle at the riding location of the user 51 means the information relating to the user 51.

The respective functions described in the above embodiment can be implemented in single or plural processing circuits. The respective processing circuits include a programmed processing device, such as a processing device including an electric circuit. The respective processing circuits also include an application-specific integrated circuit (AMC) configured to execute the functions described above, and other devices such as circuit components. The vehicle control system 10 can improve the functions of the computer.

While the present invention has been described above by reference to the embodiment, it should be understood that the present invention is not intended to be limited to the descriptions and the drawings composing part of this disclosure. Various alternative embodiments, examples, and technical applications will be apparent to those skilled in the art according to this disclosure.

For example, the above example has been illustrated with the case of the unlock of the door and the open/close of the door, the control target is not limited to the door. In addition to the door of the vehicle 40, the window of the vehicle 40 may be a control target. For example, after the vehicle 40 stopped at the riding location C where the user 51 will ride on the vehicle 40, then when the door controller 452 detected that the user 50 operated the riding cancel switch 44 before the door of the vehicle is fully opened, the door controller 452 may close the window. Thus the door controller 452 closes the door and window of the vehicle 40, therefore the user 50 can cancel the riding of the user 51.

Further, the vehicle 40 may include an alcohol detector. The situation grasping unit 232 may grasp whether or not the user 51 is the drunkard using the information detected by the alcohol detector.

The cancel of the riding-together may be expressed as a refusal of the riding-together. Further, after the vehicle 40 stopped at the riding location C, then when the riding cancel switch 44 is operated before the door is unlocked, the door control unit 452 may prohibit unlocking of the door or opening of the door.

The above-mentioned prohibition of unlocking the door or prohibition of opening the door include cancel, stop, interruption, and the like.

REFERENCE SIGNSLIST

10 vehicle control system
20 computer
21, 41, 61 communication unit
22 storage device
23, 45 controller
30 communication network
40 vehicle
42 camera
43 microphone
44 riding cancel switch
50, 51 user
60 terminal device
62 display
221 customer database
231 reservation management unit
232 situation grasping unit
233 door control unit
451 vehicle control unit
452 door control unit
453 riding prohibition unit

The invention claimed is:

1. A vehicle control device used for a vehicle in which a plurality of users can ride, and which can automatically travel, the vehicle control device comprising:
   a first controller configured to unlock or open a door of the vehicle; and
   a second controller configured to:
      receive a signal from an operation unit mounted inside the vehicle and operated by a first user in the vehicle; and
      instruct the first controller to unlock or open the door after detecting that the vehicle has stopped at a riding location where a second user will ride on the vehicle;
   wherein the first controller is further configured to:
      prohibit fully opening the door after the vehicle has stopped at the riding location where the second user, who is permitted for riding-together by the first user, will ride on the vehicle and when the signal is input from the operation unit while opening the door from a closed position to a fully open position such that the door is partially open when the first controller prohibits fully opening the door of the vehicle,
      acquire information related to outside environment of the vehicle or information related to the second user, and
      prohibit unlocking the door only when it is determined that the acquired information satisfies a predetermined condition.

2. A vehicle control device that is used for a vehicle in which a plurality of users can ride, and which can automatically travel, the vehicle control device comprising:
   a first controller configured to unlock or open a door of the vehicle; and
   a second controller configured to:
      receive a signal from an operation unit mounted inside the vehicle operated by a first passenger in the vehicle; and
      instruct the first controller to unlock or open the door after detecting that the vehicle has stopped at a riding location where a second passenger will ride on the vehicle,
   wherein the first controller is configured to prohibit fully opening the door after the vehicle has stopped at the riding location where the second passenger will ride on the vehicle and when the signal was input from the operation unit while opening the door from a closed position to a fully open position such that the door is partially open when the first controller prohibits fully opening the door of the vehicle.

3. The vehicle control device according to claim 2, wherein the vehicle is a riding-together travelling service vehicle by a plurality of passengers.

4. The vehicle control device according to claim 2, wherein the first controller is configured to lock or close the door when the first controller detects a signal indicating that a riding cancel switch has been operated.

5. The vehicle control device according to claim 2, wherein the first controller is configured to:
acquire information related to an outside environment of the vehicle or information related to the second passenger, and
prohibit unlocking the door only when it is determined that the acquired information satisfies a predetermined condition.

6. The vehicle control device according to claim 5, wherein:
the information relating to outside environment of the vehicle includes a captured image at the riding location of the second passenger, and
the information relating to the second passenger includes a data input based on an operation of a person outside the vehicle at the riding location of the second passenger.

7. The vehicle control device according to claim 6, wherein the predetermined condition includes in a case where the second passenger cannot be identified from the captured image at the riding location of the second passenger, the captured image means the information relating to outside environment of the vehicle, or in a case where the data input based on the operation of the person outside the vehicle at the riding location of the second passenger does not coincide with a reserved information relating to the second passenger, the data input based on the operation of the person outside the vehicle at the riding location of the second passenger means the information relating to the second passenger.

8. A vehicle control system that is used for a vehicle in which a plurality of users can ride, and which can automatically travel, the vehicle comprising:
a switch that is operated when a first passenger in the vehicle cancels riding of a second passenger, and
a controller,
wherein the controller prohibits fully opening a door of the vehicle after the vehicle has stopped at a riding location where the second passenger will ride on the vehicle and when the controller has detected that the first passenger who permitted a riding-together with the second passenger operated the switch while opening the door from a closed position to a fully open position such that the door is partially open when the first controller prohibits fully opening the door of the vehicle.

9. The vehicle control system according to claim 8, further comprising:
a computer capable of communicating with the vehicle, the vehicle further comprising:
a camera that captures images around the vehicle and inside the vehicle or a microphone that acquires voice outside the vehicle and inside the vehicle,
wherein when the computer detected that the first passenger operated the switch, the computer determines a validity of the operation by the first passenger using information acquired from the camera or the microphone.

10. The vehicle control system according to claim 9, wherein:
the computer further comprises that a storage device that stores information relating to the first passenger and the second passenger, and
the computer determines the validity using past histories relating to the first passenger and the second passenger, the past histories are stored in the storage device.

11. The vehicle control system according to claim 10, wherein after the computer determined the validity, the computer stores the determination result of the validity as the history of the first passenger and the second passenger in the storage device.

* * * * *